(12) United States Patent
Acosta (10) Patent No.: US 7,163,097 B2
(45) Date of Patent: Jan. 16, 2007

(54) BI-DIRECTIONAL FRICTION CLUTCH ASSEMBLY FOR ELECTRIC MOTORS TO PREVENT BACKDRIVE

(75) Inventor: Luis E. Acosta, Lawrenceville, GA (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 94 days.

(21) Appl. No.: 10/961,013

(22) Filed: Oct. 8, 2004

(65) Prior Publication Data

US 2005/0189189 A1 Sep. 1, 2005

Related U.S. Application Data

(60) Provisional application No. 60/547,833, filed on Feb. 26, 2004, provisional application No. 60/551,713, filed on Mar. 10, 2004.

(51) Int. Cl.
*H02K 7/10* (2006.01)
*F16D 51/00* (2006.01)

(52) U.S. Cl. .................. 192/223.2; 192/223; 310/77
(58) Field of Classification Search ............... 192/223
See application file for complete search history.

(56) References Cited

U.S. PATENT DOCUMENTS

| | | | |
|---|---|---|---|
| 5,582,279 A | 12/1996 | Buchanan, Jr. et al. .... | 192/54.5 |
| 6,288,464 B1 | 9/2001 | Torii et al. ..................... | 310/78 |
| 6,390,264 B1 * | 5/2002 | Torii et al. ................ | 192/223.2 |
| 6,789,443 B1 * | 9/2004 | Torii et al. ................ | 192/223.2 |
| 7,032,731 B1 * | 4/2006 | Kim ............................. | 192/15 |

FOREIGN PATENT DOCUMENTS

| | | |
|---|---|---|
| EP | 1101967 A1 | 5/2001 |
| EP | 1101968 A1 | 5/2001 |
| EP | 1122390 A2 | 8/2001 |
| WO | WO 00/08350 A1 * | 2/2000 |
| WO | WO 01/53640 A1 | 7/2001 |

OTHER PUBLICATIONS

PCT International Search Report mailed Apr. 27, 2005.
PCT Notification of Transmittal of the International Search Report and Written Opinion.
PCT Written Opinion of the International Searching Authority.
U.S. Appl. No. 11/341,841, filed Jan. 27, 2006.

* cited by examiner

*Primary Examiner*—Rodney H. Bonck (57) ABSTRACT

A clutch assembly 100 is provided for a motor having an armature shaft and a worm shaft having a worm constructed and arranged to engage a gear. The clutch assembly includes a clutch housing 112 including a race surface 132; a cam 117 coupled to the worm shaft; follower structure 122 operatively associated with the cam; a clutch plate 114, and a clutch coupler 118 associated with the clutch plate, the cam, and the follower structure. The coupler is coupled to the armature shaft for rotation therewith, such that rotation of the coupler rotates the clutch plate, the cam and follower structure, and thus the worm shaft. During a back drive condition of the motor, when torque is transmitted to the worm shaft and thus to the cam, the cam is constructed and arranged to causes the follower structure 122 to contact and exert pressure on the race surface 132 thereby preventing rotation of the worm shaft.

17 Claims, 7 Drawing Sheets

BI-DIRECTIONAL FRICTION CLUTCH ASSEMBLY FOR ELECTRIC MOTORS TO PREVENT BACKDRIVE

This application is based on U.S. Provisional Application No. 60/547,833, filed on Feb. 26, 2004 and U.S. Provisional Application No. 60/551,713, filed on Mar. 10, 2004, and claims the benefit of thereof for priority purposes.

FIELD OF THE INVENTION

The invention relates to a bi-directional clutch assembly for electric motors that becomes operational (engages) whenever an output shaft side becomes the driving element.

BACKGROUND OF THE INVENTION

In a motor having a worm and gear, there is a need to prevent the worm and gear from reaching a back driven condition in the event that an external torque is applied at an output end of a gear arrangement. When such a motor is coupled to a load, a driving torque will act on the motor output drive under certain conditions. This torque can be transmitted from the drive gear to the worm shaft inducing an angular motion on the motor armature (back drive). When this condition is reached, the system ceases to operate as intended; for example, in the case of a window lift motor, this can mean that the window moves downward from an original position without operator intervention under vibration conditions (driving the vehicle). Another scenario causing back drive could be an individual pushing down the glass to gain access to the vehicle.

Currently, controlling a back drive condition is achieved by decreasing the gearing efficiency. However, this results in a negative effect in that the overall system efficiency is decreased as well, possibly requiring a larger motor.

By selectively having the ability to lock the drive system, the efficiency of the worm and gear arrangement can be increased to a higher level, minimizing concerns of back drive.

Thus, there is a need for a bi-directional clutch assembly for electric motors that engages whenever an output shaft side becomes the driving element thereby minimizing back drive.

SUMMARY OF THE INVENTION

An object of the invention is to fulfill the need referred to above. In accordance with the principles of the present invention, this objective is achieved by providing a clutch assembly for a motor having an armature shaft and a worm shaft having a worm constructed and arranged to engage a gear. The clutch assembly includes a clutch housing including a race surface; a cam coupled to the worm shaft; follower structure operatively associated with the cam; a clutch plate, and a clutch coupler associated with the clutch plate, the cam, and the follower structure. The coupler is coupled to the armature shaft for rotation therewith, such that rotation of the coupler rotates the clutch plate, the cam and follower structure, and thus the worm shaft. During a back drive condition of the motor, when torque is transmitted to the worm shaft and thus to the cam, the cam is constructed and arranged to causes the follower structure to contact and exert pressure on the race surface thereby preventing rotation of the worm shaft.

In accordance with another aspect of the invention, a method is provided to control back drive in a motor. The motor includes an armature shaft and a worm shaft having a worm constructed and arranged to engage a gear. The method provides a clutch assembly having a clutch housing including a race surface; a cam coupled to the worm shaft; follower structure associated with the cam; a clutch plate; and a clutch coupler associated with the clutch plate, the cam, and the follower structure. The coupler is coupled to the armature shaft for rotation therewith, such that rotation of the coupler rotates the clutch plate, the cam and follower structure, and thus the worm shaft. The method ensures that 1) during a back drive condition of the motor, when the worm shaft is a driving element and when torque is transmitted to the worm shaft and thus to the cam, the cam causes the follower structure to contact and exert pressure on the race surface thereby preventing rotation of the worm shaft, and 2) during a normal operating condition of the motor, when the armature shaft is a driving element, the follower structure does not contact the race surface, thereby permitting the worm shaft to rotate freely.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWING

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

Figure 1:
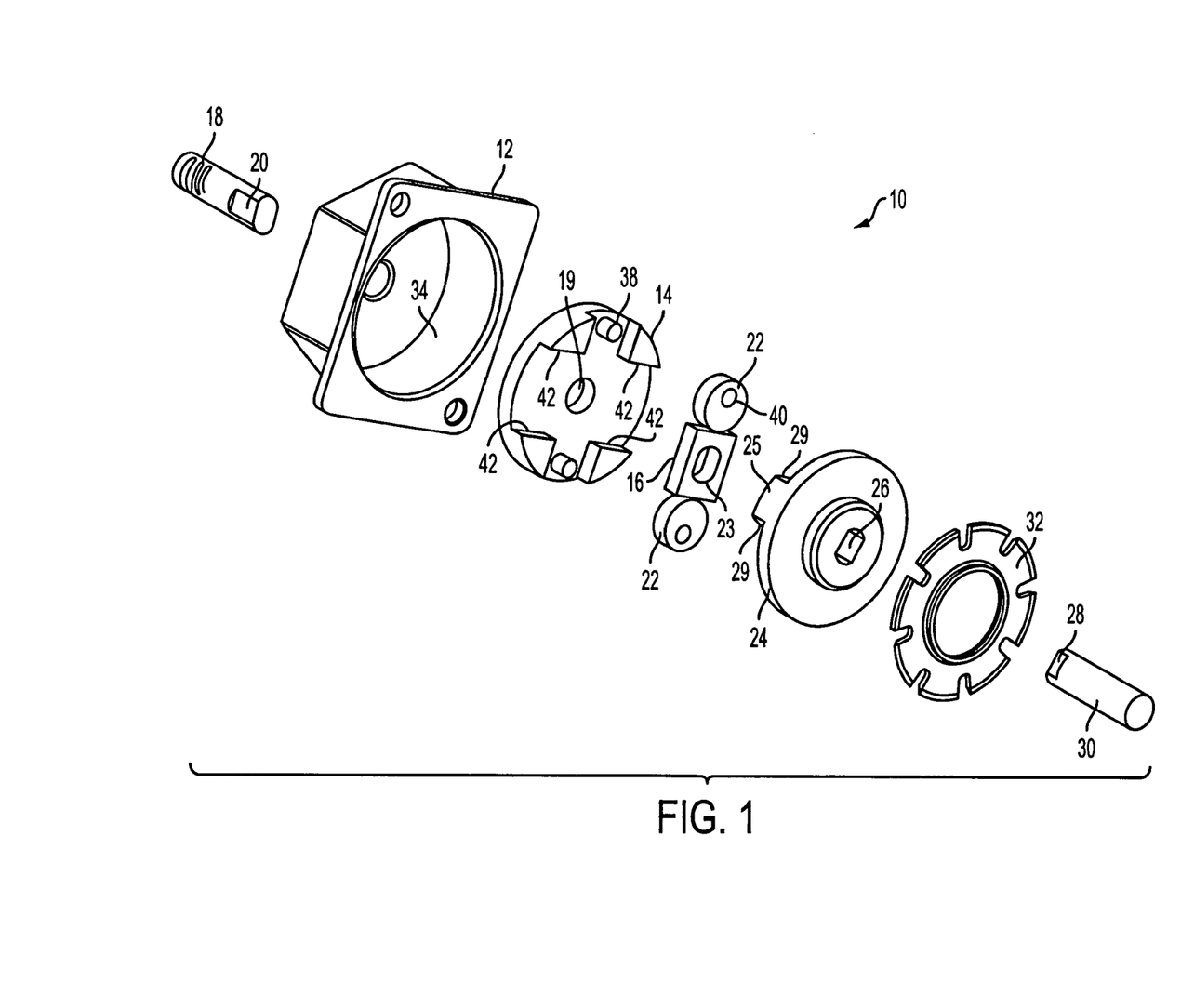
FIG. 1 is a front exploded view of a clutch assembly for a worm and gear arrangement provided in accordance with the principles of the invention.
Figure 2:
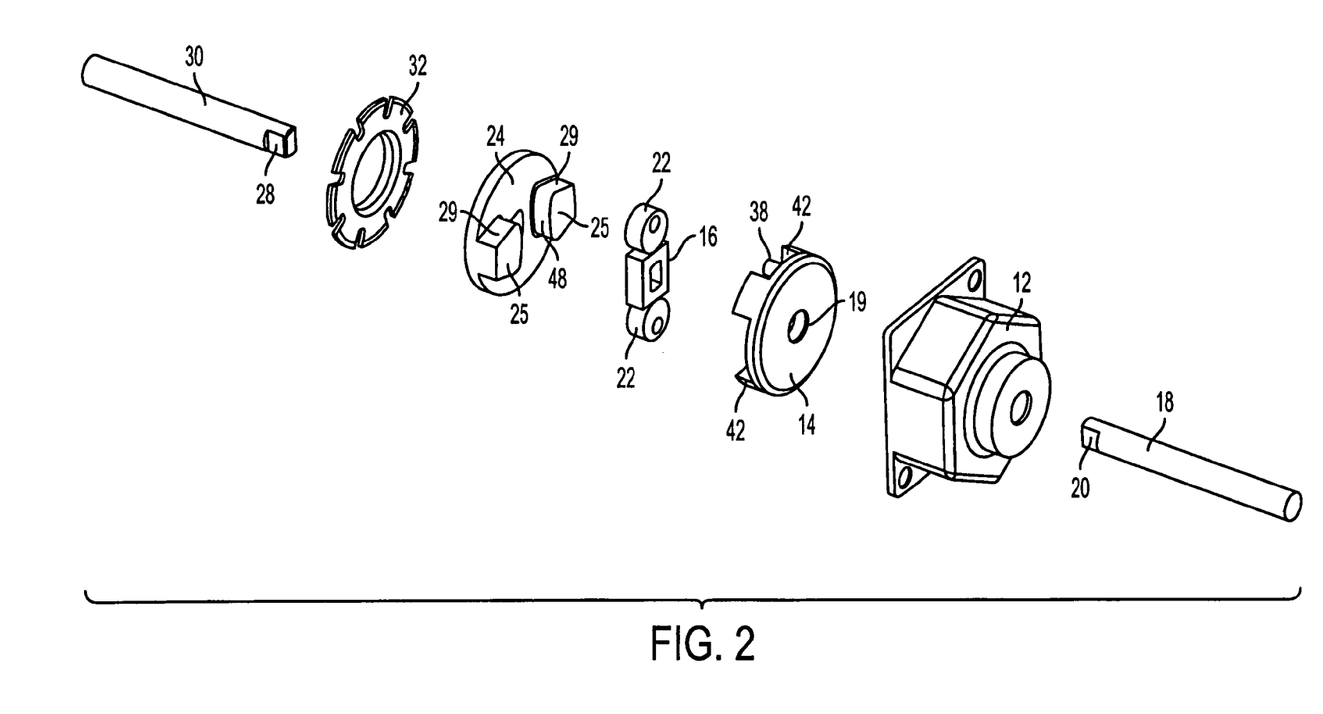
FIG. 2 is a rear exploded view of the clutch assembly of FIG. 1.
Figure 5:
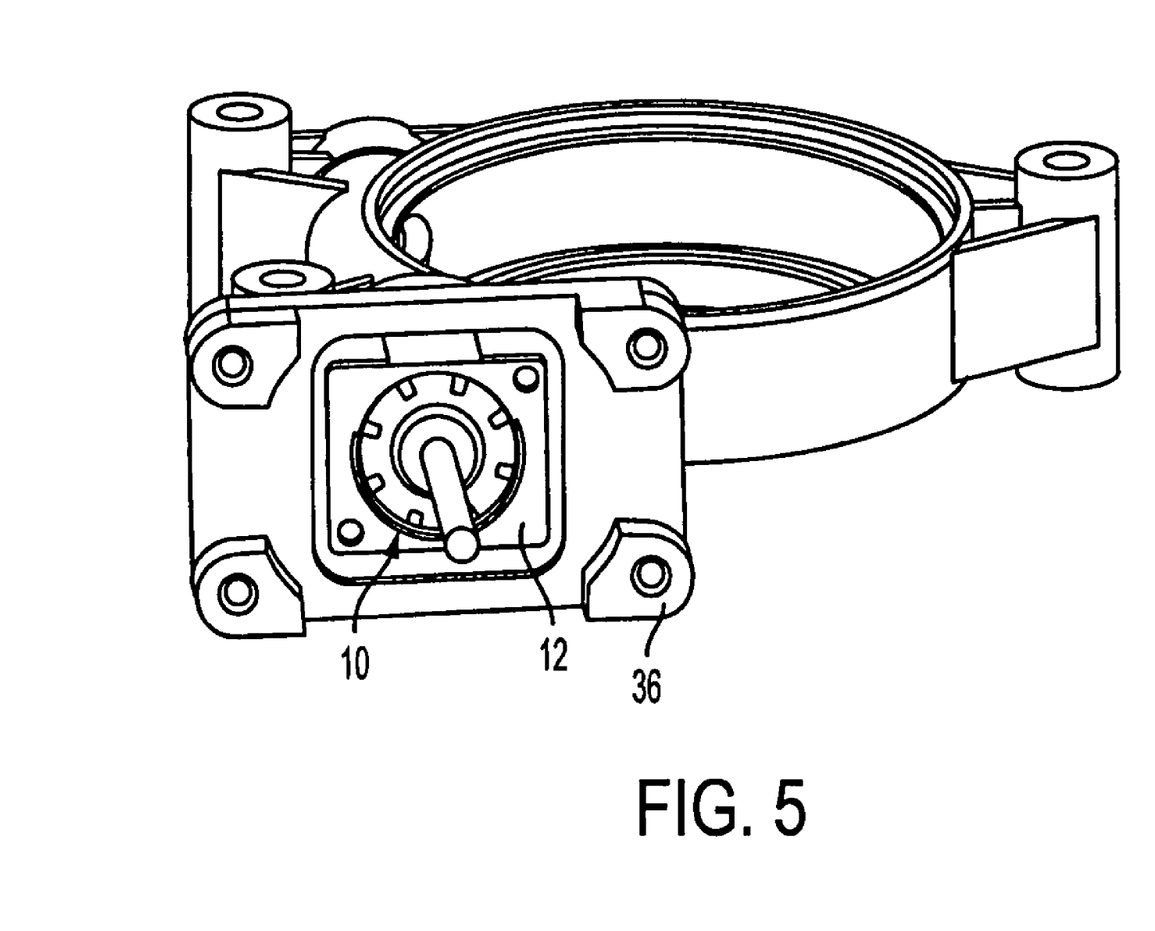
FIG. 5 is a perspective view of the clutch assembly of the invention incorporated into a housing of a window lift motor assembly.

A clutch assembly is shown, generally indicated at 10, in FIG. 1 in accordance with the principles of the present invention. The clutch assembly 10 includes a clutch housing 12 having an inner race surface 34, a support plate 14, a cam 16 having a keyhole 23 so as to be coupled to a worm shaft 18 at end 20, cam followers 22 associated with the cam 16, a coupler 24 having a keyhole 26 connected with an end 28 of a shaft 30 of a motor armature (not shown), and a retainer 32 for retaining the support plate, cam and followers and coupler within the housing 12. With reference to FIG. 5, the clutch assembly 10 can be mounted to a housing 36 of a motor, such as a conventional window lift motor for a vehicle, so that the worm shaft 18 meshes with the conventional drive gear of the motor.

The support plate 14 can also be considered a clutch plate and includes a central opening 19 to permit the shaft 18 to pass there-through. In addition, the support plate 14 includes two pins 38 extending therefrom and each follower 22 includes an off-center bore 40 there through. Each pin 38 is received in an associated bore 40 to define an eccentric follower. In addition, in the embodiment of FIGS. 1–4, the support plate 14 includes engagement surfaces 42 constructed and arranged to engage a surfaces 29 of the coupler as explained below.

Figure 3:
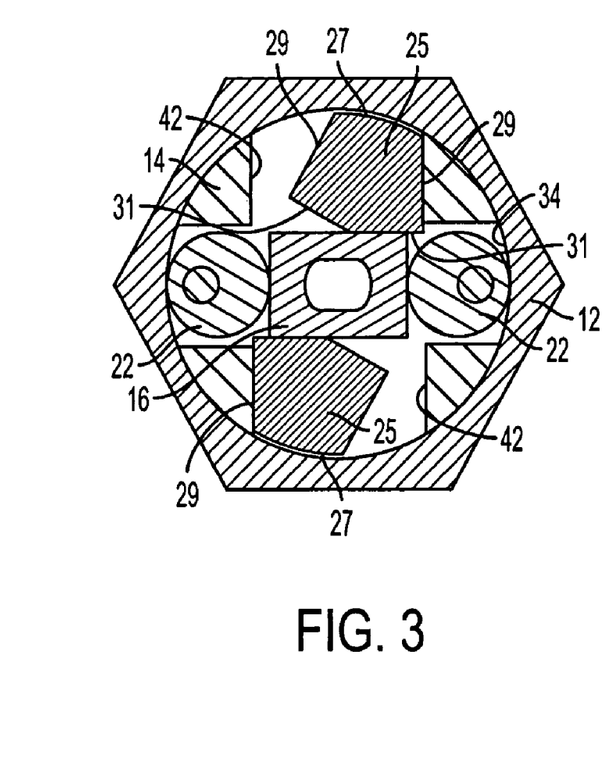
FIG. 3 is a sectional view of the clutch assembly of the invention shown in a normal operating condition.

The coupler 24 includes engagement members 25 disposed in spaced relation such that the cam 16 is therebetween (FIG. 3). Each engagement member 25 is of generally pentagon shape except that bottom surface 27 is a curved surface. Thus, in addition to the bottom surface 27, each engagement member 25 has a pair of side surfaces 29 and a pair of top surfaces that meet at an apex 48, the function of which will be apparent below.

If the motor armature (via shaft 30) is the driving element, the support plate 14, cam 16 and followers 22 have the same relative angular position relative to each other. Thus, as shown in FIG. 3, a side surface 29 of each engagement member 25 contacts an associated engagement surface 42 of the support plate 14. In addition, a top surface 31 of each engagement member 25 contacts the cam 16. As a result, there is no radial force acting on the followers 22 allowing the motor to operate as intended.

The support plate 14 is "floating" with relation to all other components and will freely spin when the motor armature is the driving element (via shaft 30). The coupler 24 engages the support plate 14 and cam 16 simultaneously, maintaining the alignment of the followers 22 with respect to the cam 16.

Figure 4:
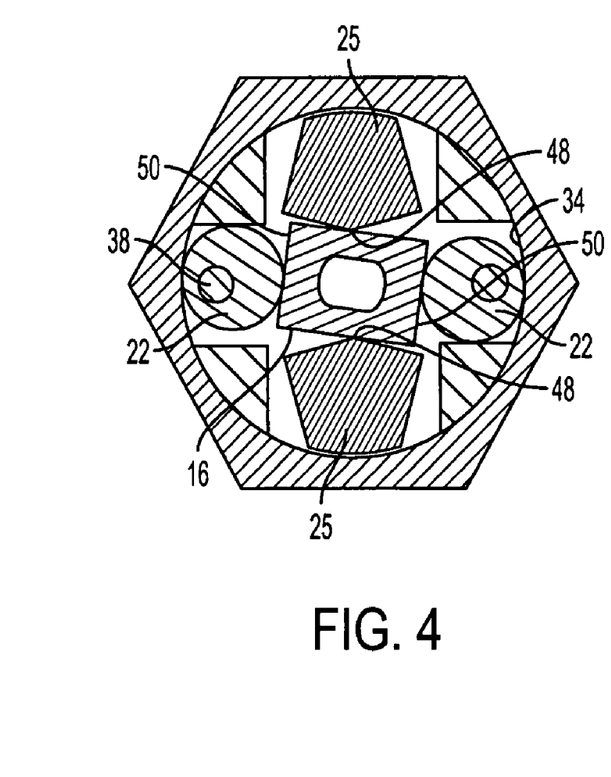
FIG. 4 is a sectional view of the clutch assembly of the invention shown in a back drive condition.

In an initial back drive condition, as shown in FIG. 4, when the worm end (shaft 18) is the driving element, torque on the worm shaft 18 causes the cam 16 to rock or rotate with respect to apexes 48 of the coupler 24 and thereby engage the followers 22 via sides 50 of the cam 16. Since the rectangular cam 16 is rotated and contact of the cams is generally along the diagonal, each eccentric follower 22 rotates slightly about the respective pin 38 and is pressed on the inner race 34, locking the plate 14 and shaft 18 and thus the motor due to friction.

It can be appreciated that mating parts of the support plate 14 and coupler 24 can be reversed.

In general, the clutch assembly 10 can be used in any application involving the use of worm gearing coupled to electric motors. This assembly 10 was configured with automotive window lift applications in mind.

FIGS. 6–9 show a clutch assembly, generally indicated at 100, in accordance with a second embodiment of the invention. The clutch assembly 100 includes a clutch housing 112, a clutch plate 114, a cam 116 having a keyhole 117 so as to be coupled to an end of a worm shaft (not shown), and a clutch coupler 118 having a keyhole 120 for connection with an end of a shaft (not shown) of a motor armature (not shown). The coupler 118 also includes engagement members 125 extending there from and of the type described above with regard to the first embodiment.

The clutch assembly 100 can be mounted to a housing of a motor, such as a conventional window lift motor for a vehicle, so that the worm shaft meshes with the conventional drive gear (not shown) of the motor.

Figure 6:
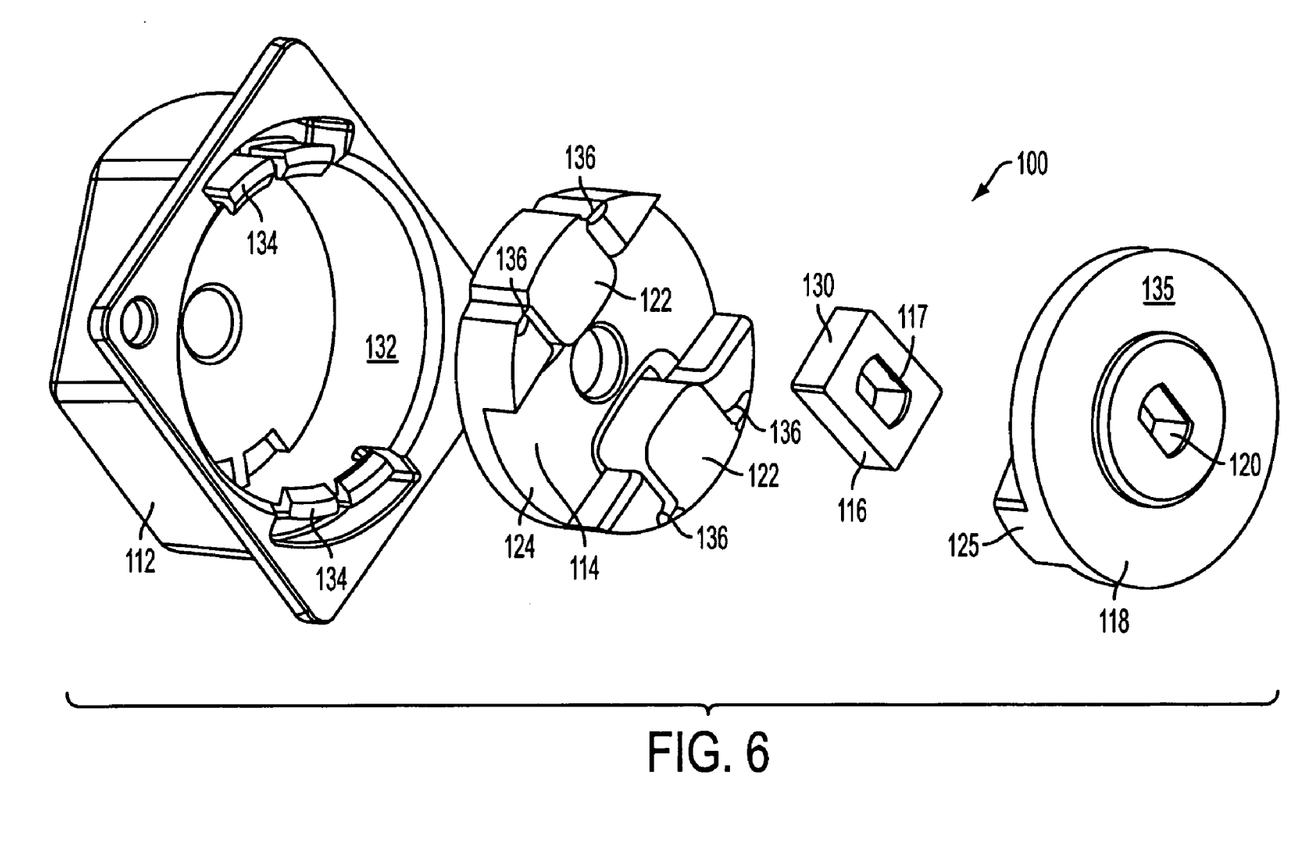
FIG. 6 is a front exploded view of a clutch assembly for a worm and gear arrangement provided in accordance with a second embodiment of the invention.
Figure 7:
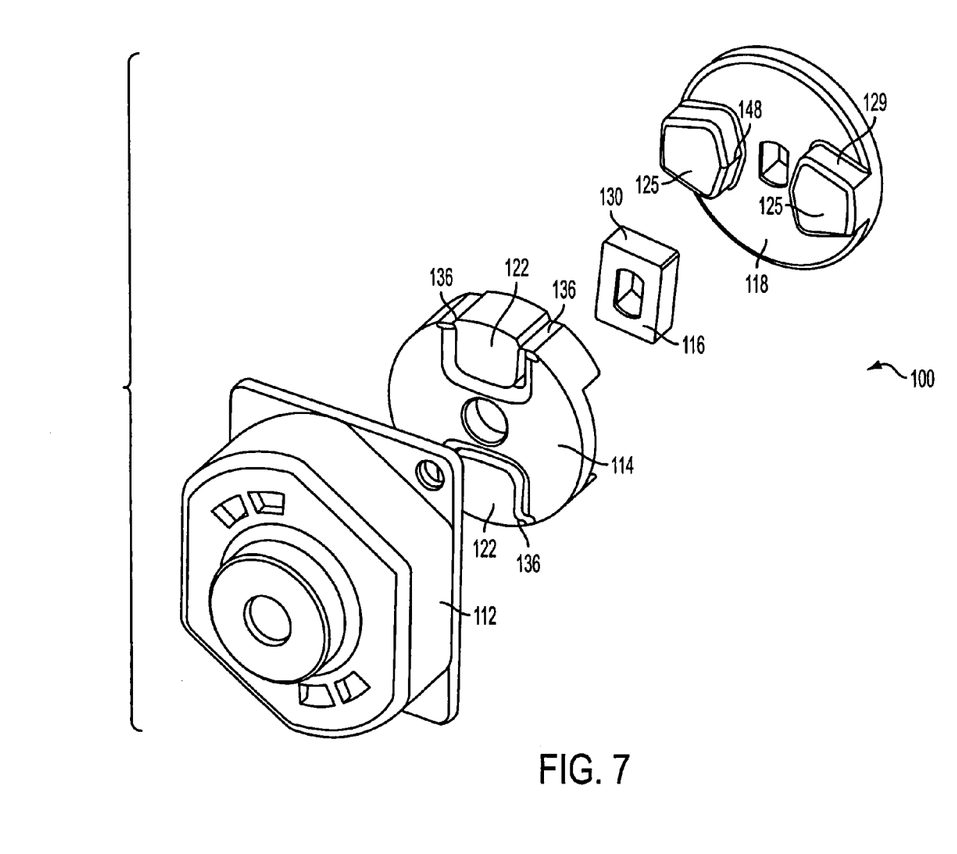
FIG. 7 is a rear exploded view of the clutch assembly of FIG. 6.

The clutch plate 114 includes two followers 122 in opposing relation and extending from a body 124 of the clutch plate 114. The followers 122 are preferably molded as an integral part of the clutch plate. In the illustrated embodiment, each follower 122 is connected to the clutch plate 114 by a pair of flexible bridging members 136. Alternatively, for each of molding, each follower 122 can be connected to the clutch plate 114 by single bridging member that defines a living hinge.

Figure 8:
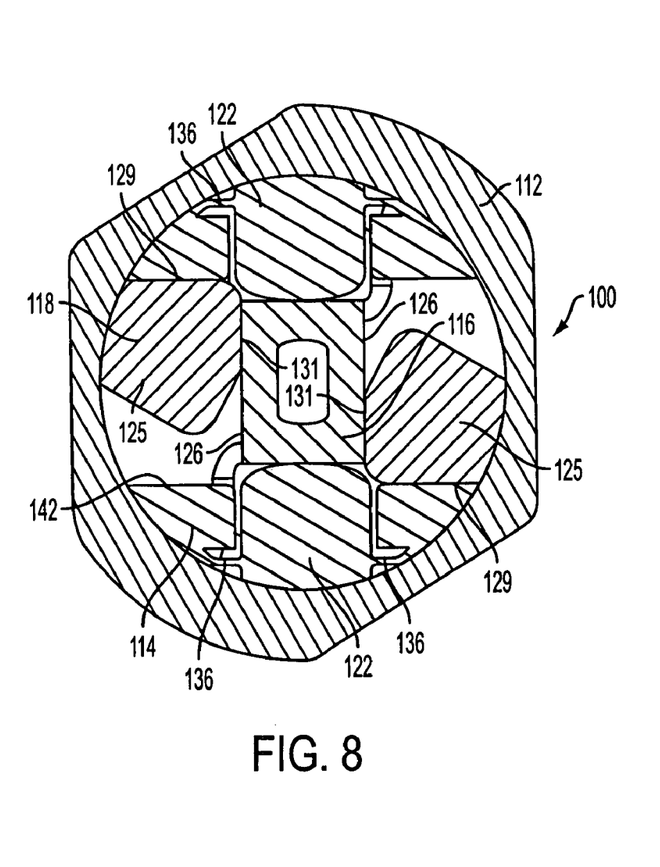
FIG. 8 is a sectional view of the clutch assembly of the second embodiment of the invention shown in a normal operating condition.

If the motor armature is the driving element, the clutch plate 114 with its followers 122, and the cam 116 have the same relative angular position with respect to each other. Thus, as shown in FIG. 8, a side surface 129 of each engagement member 125 of the coupler 118 contacts an associated engagement surface 142 of the clutch plate 114. In addition, a top surface 131 of each engagement member 125 contacts the cam 116. As a result, there is no radial force acting on the followers 122 allowing the motor to operate as intended.

The clutch plate 114 is "floating" with relation to all other components and will freely spin when the motor armature is the driving element. The engagement members 125 of the coupler 118 engage the clutch plate 114 and cam 116 simultaneously, maintaining the alignment of the followers 122 with respect to the cam 116.

Figure 9:
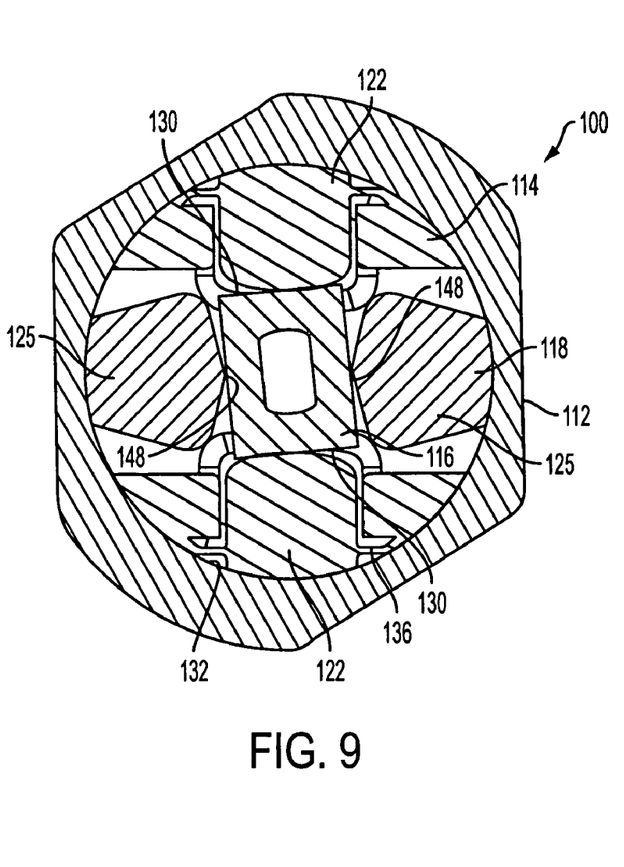
FIG. 9 is a sectional view of the clutch assembly of the second embodiment of the invention shown in a back drive condition.

In an initial back drive condition, as shown in FIG. 9, when the worm shaft end is the driving element, torque on the worm shaft causes the cam 116 to rock or rotate with respect to apexes 148 of the engagement members 125 of the coupler 118 and thereby engages the followers 122 via surfaces 130 of the cam 116. Since the rectangular cam 116 is rotated the followers 122 are pressed on the inner race 132 (clutch housing inner diameter surface), locking the shaft 118 and thus the motor due to friction, preventing back drive. The followers 122 are capable of being pressed to the inner race 132 due to the thin, flexible bridging portions 136 connecting the followers to the clutch plate 114.

Retaining structure 134, in the form of resilient clips, is integral with the housing 112 to retain the components in the housing 112. In particular, once assembled, the clips 134 engage surface 135 of the coupler (FIG. 6).

Since only four components comprise the clutch assembly 100, an electric motor employing the clutch assembly 100 can be configured with a smaller size and with less cost and can be used in the same original application.

In general, the clutch assembly 100 can be used in any application involving the use of worm gearing coupled to electric motors. The assembly 100 was configured with automotive window lift applications in mind.

The desired effect of the use of this clutch assembly 10, 100 is that an increase in the gearing efficiency allows for a smaller motor design, with the desired reduction in system costs.

The clutch assembly 10, 100 utilizes the principle of an overrunning clutch, with the added feature that it becomes operational on both angular directions, as long as the worm and gear become the driving elements. The clutch assembly is configured to be a self-contained unit for ease of assembly in the motor, and it incorporates all the characteristic of a sleeve bearing so it can replace an existing one.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A clutch assembly for a motor having an armature shaft and a worm shaft having a worm constructed and arranged to engage a gear, the clutch assembly comprising:
   a clutch housing including a race surface,
   a cam coupled to the worm shaft,
   follower structure operatively associated with the cam,
   a clutch plate, and
   a clutch coupler associated with the clutch plate, the cam, and the follower structure, the coupler being coupled to the armature shaft for rotation therewith, such that rotation of the coupler rotates the clutch plate, the cam and follower structure, and thus the worm shaft,
   whereby during a back drive condition of the motor, when torque is transmitted to the worm shaft and thus to the cam, the cam is constructed and arranged to cause the follower structure to contact and exert pressure on the race surface thereby preventing rotation of the worm shaft,
   wherein the coupler includes a pair of engagement members disposed in spaced relation with the cam therebetween, each engagement member having a pair of side surfaces and a pair of top surfaces, with the top surfaces meeting to define an apex.

2. The assembly of claim 1, wherein the clutch plate includes engagement surfaces associated with the side surfaces of each engagement member such that when the armature shaft is a driving element, a side surface of each engagement member of the coupler contacts an associated engagement surface of the clutch plate and a top surface of each engagement member contacts the cam, permitting the clutch plate to rotate freely.

3. The assembly of claim 1, wherein during the back drive condition, when the worm shaft is a driving element, the torque on the worm shaft causes the cam to rotate with respect to apexes and thereby engage the follower structure causing the follower structure to press on the inner race.

4. The assembly of claim 3, wherein the follower structure includes a pair of followers integral with the clutch plate and each follower being connected to the clutch plate by at least one flexible bridging portion, the bridging portions being constructed and arranged to permit the followers to engage the race surface when the followers are engaged by the cam.

5. The assembly of claim 3, wherein the follower structure includes a pair of eccentric followers each having an off-center bore there through, and wherein the clutch plate includes pins extending from a surface thereof, each bore of a follower receiving an associated pin and wherein when the cam engages the followers, each follower rotates about the associated pin and presses on the race surface.

6. The assembly of claim 4, wherein the clutch housing includes integral retaining structure constructed and arranged to retain the cutch plate, cam and coupler in the housing.

7. The assembly of claim 6, wherein the retaining structure includes resilient clips that engage a surface of the coupler.

8. The assembly of claim 1, wherein the cam is of generally rectangular configuration.

9. A clutch assembly for a motor having an armature shaft and a worm shaft having a worm constructed and arranged to engage a gear, the clutch assembly comprising:
   a clutch housing including a race surface,
   a cam coupled to the worm shaft,
   means for pressing, associated with the cam,
   a clutch plate, and
   a clutch coupler associated with the clutch plate, the cam, and the means for pressing, the coupler being coupled to the armature shaft for rotation therewith, such that rotation of the coupler rotates the clutch plate, the cam and means for pressing, and thus the worm shaft,
   whereby during a back drive condition of the motor, when torque is transmitted to the worm shaft and thus to the cam, the cam is constructed and arranged to cause the means for pressing to contact and exert pressure on the race surface thereby preventing rotation of the worm shaft,
   wherein the coupler includes a pair of engagement members disposed in spaced relation with the cam therebetween, each engagement member having a pair of side surfaces and a pair of top surfaces, with the top surfaces meeting to define an apex.

10. The assembly of claim 9, wherein the clutch plate includes engagement surfaces associated with the side surfaces of each engagement member such that when the armature shaft is a driving element, a side surface of each engagement member of the coupler contacts an associated engagement surface of the clutch plate and a top surface of each engagement member contacts the cam, permitting the clutch plate to rotate freely.

11. The assembly of claim 9, wherein during the back drive condition, when the worm shaft is a driving element, the torque on the worm shaft causes the cam to rotate with respect to apexes and thereby engage the means for pressing, causing the means for pressing to press on the inner race.

12. The assembly of claim 11, wherein the means for pressing is integral with the clutch plate and connected to the clutch plate by at least one flexible bridging portion, the bridging portion being constructed and arranged to permit the means for pressing to engage the race surface when the means for pressing is engaged by the cam.

13. The assembly of claim 11, wherein the means for pressing includes eccentric followers each having off-center bore there through, and wherein the clutch plate includes pins extending from a surface thereof, each bore of a follower receiving an associated pin and wherein when the cam engages the followers, each follower rotates about the associated pin and presses on the race surface.

14. The assembly of claim 12, wherein the clutch housing includes integral means for retaining the cutch plate, cam and coupler in the housing.

15. The assembly of claim 14, wherein the means for retaining includes resilient clips that engage a surface of the coupler.

16. The assembly of claim 9, wherein the cam is of generally rectangular configuration.

17. A method of controlling back drive in a motor, the motor including an armature shaft and a worm shaft having a worm constructed and arranged to engage a gear, the method including:
   ensuring that a clutch assembly has a clutch housing including a race surface; a cam coupled to the worm shaft; follower structure associated with the cam; a clutch plate; and a clutch coupler associated with the clutch plate, the cam, and the follower structure, wherein the coupler is coupled to the armature shaft for rotation therewith, such that rotation of the coupler rotates the clutch plate, the cam and follower structure, and thus the worm shaft, and wherein the coupler includes a pair of engagement members disposed in spaced relation with the cam there-between, each engagement member having a pair of side surfaces and a pair of top surfaces, with the top surfaces meeting to define an apex, and ensuring that 1) during a back drive condition of the motor, when the worm shaft is a driving element and when torque is transmitted to the worm shaft and thus to the cam, the cam causes the follower structure to contact and exert pressure on the race surface thereby preventing rotation of the worm shaft, and 2) during a normal operating condition of the motor, when the armature shaft is a driving element, the follower structure does not contact the race surface, thereby permitting the worm shaft to rotate freely.

* * * * *